US010957164B1

(12) United States Patent
Lin (10) Patent No.: US 10,957,164 B1
(45) Date of Patent: Mar. 23, 2021

(54) SETTING DEVICE FOR CLAW MACHINE

(71) Applicant: Chen-Chi Lin, Taichung (TW)

(72) Inventor: Chen-Chi Lin, Taichung (TW)

( * ) Notice: Subject to any disclaimer, the term of this patent is extended or adjusted under 35 U.S.C. 154(b) by 0 days.

(21) Appl. No.: 16/595,431

(22) Filed: Oct. 7, 2019

(51) Int. Cl.
| G07F 17/32 | (2006.01) |
| A63F 9/30 | (2006.01) |
| G06F 3/0482 | (2013.01) |
| G06F 17/18 | (2006.01) |
| G06F 3/0481 | (2013.01) |

(52) U.S. Cl.
CPC .......... G07F 17/3297 (2013.01); A63F 9/30 (2013.01); G06F 3/0482 (2013.01); G06F 3/04817 (2013.01); G06F 17/18 (2013.01)

(58) Field of Classification Search
None
See application file for complete search history.

(56) References Cited

U.S. PATENT DOCUMENTS

| 6,336,636 B1 * | 1/2002 | Smart ................ A63F 9/30 273/447 |
| 2003/0011133 A1 * | 1/2003 | Uedono ............. A63F 9/30 273/447 |
| 2006/0149415 A1 * | 7/2006 | Richards ............ G07F 9/002 700/236 |
| 2007/0114725 A1 * | 5/2007 | Peck ............... G07F 17/3295 273/447 |
| 2007/0210523 A1 * | 9/2007 | Verstraeten ........... A63F 9/30 273/447 |
| 2010/0086687 A1 * | 4/2010 | Hayashi ............ C09D 11/326 427/256 |
| 2012/0190417 A1 * | 7/2012 | Balaban ............... A63F 9/24 463/9 |

(Continued)

FOREIGN PATENT DOCUMENTS

| JP | 2005341998 A | * 12/2005 |
| JP | 2008125970 A | * 6/2008 |

(Continued)

OTHER PUBLICATIONS

Innovative Concepts in Entertainment, CX1700X Crane Service Manual, Jun. 22, 2015, https://www.icegame.com/images/document/068d0fc6-c809-493f-8a3f-00b418d778e4/CX1700X%20Rev%20G%20Crane%20orginal%2040%20commands%206-22-2015.pdf , pp. 13-17 (Year: 2015).*

*Primary Examiner* — Tramar Y Harper
(74) *Attorney, Agent, or Firm* — Raymond Y. Chan; David and Raymond Patent Firm (57) ABSTRACT

A setting device for a claw machine is disclosed. The setting device includes: a cabinet, containing therein prizes; a movable gantry assembly, being installed at a top of the cabinet; a claw member, attached to the gantry assembly from below through a string; and a control device, installed outside the cabinet. The control device has a control circuit module, a joystick, a color liquid crystal display, a music player, and a button. After putting one or more coins, a player is allowed to operate the joystick of the control device to displace the gantry assembly and the claw member. The cabinet has a collection hole communicating with the exterior. The color liquid crystal display displays a setting interface. The disclosed device allows a machine owner to easily set relevant setting items through the setting interface so as to provide players with variable playing experiences and in turn increasing revenues of the claw machine.

7 Claims, 11 Drawing Sheets

(56) References Cited

U.S. PATENT DOCUMENTS

| | | | | |
|---|---|---|---|---|
| 2015/0018058 A1* | 1/2015 | Sato | ............... | A63F 7/0058 |
| | | | | 463/7 |
| 2017/0352228 A1* | 12/2017 | Kramer | ............... | G07F 17/3295 |
| 2019/0251795 A1* | 8/2019 | Smart | ............... | G07F 17/3248 |

FOREIGN PATENT DOCUMENTS

| | | | | |
|---|---|---|---|---|
| JP | 2010029429 A | * | 2/2010 | |
| JP | 2012055494 A | * | 3/2012 | |
| JP | 2019136207 A | * | 8/2019 | |

* cited by examiner

| Ref | Label | Value |
|---|---|---|
| 431 | Forward Speed | 65 |
| 432 | Backward Speed | 55 |
| 433 | Leftward Speed | 60 |
| 434 | Rightward Speed | 64 |
| 439 | Hovering & Delay | OFF |
| 43A | Raising Delay | 50 |
| 43B | Claw Dropping Variable | OFF |
| 43C | Tightening Delay | OFF |
| 435 | Claw Dropping Speed | 69 |
| 436 | Claw Raising Speed | 57 |
| 437 | Hovering & Raising | 1 |
| 438 | Hovering & Dropping | OFF |
| 43D | Bottom Delay | OFF |
| 43E | String Length | 12 |
| 43F | Exit | |
| 430 | | |

SETTING DEVICE FOR CLAW MACHINE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a setting device for a claw machine, which allows a machine owner to easily set setting items through a setting interface displayed in a color liquid crystal display, so as to provide players with variable playing experiences and in turn increasing revenues of the claw machine.

Description of Related Arts

Figure 1:
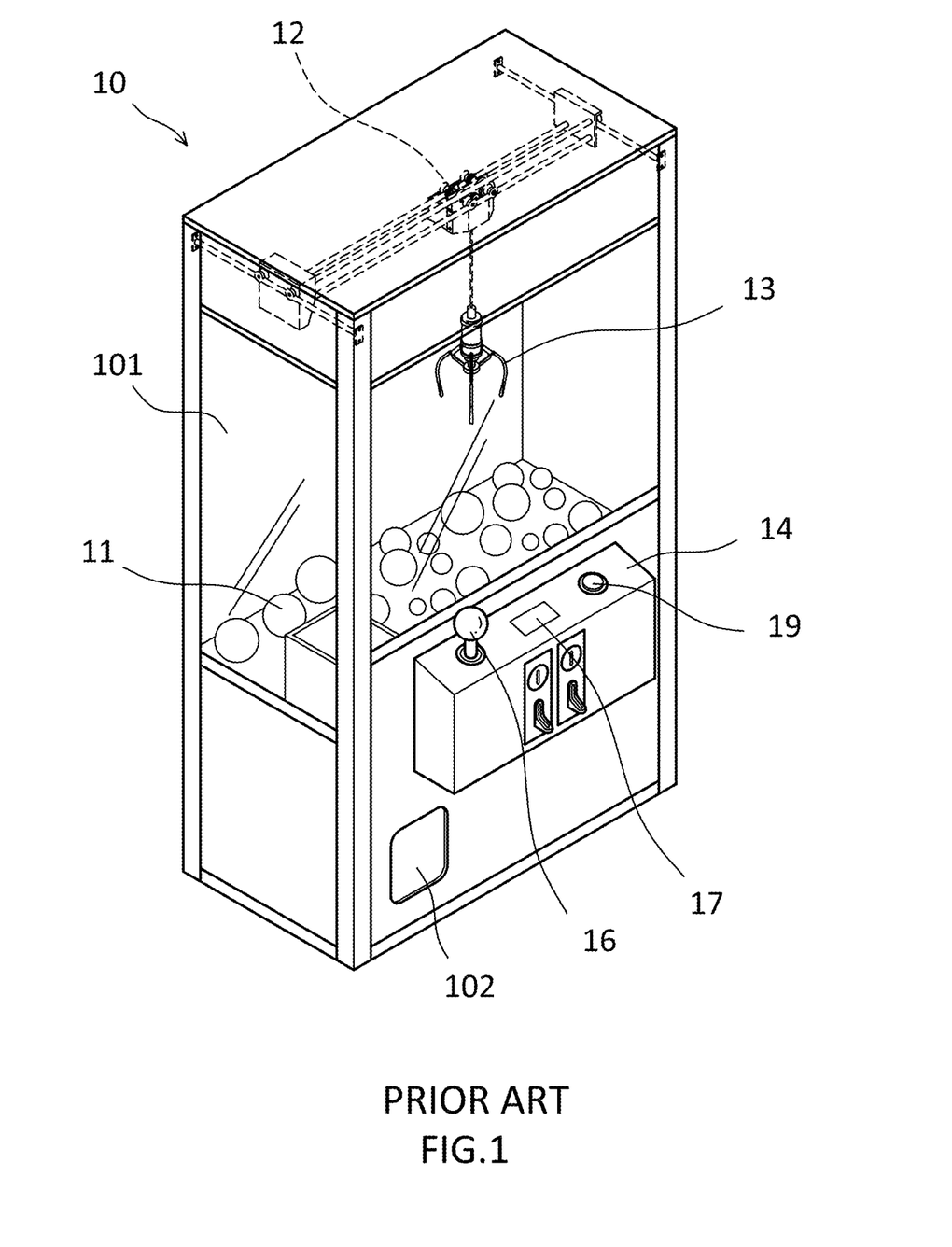
FIG. 1 is a perspective view of a conventional claw machine.
Figure 2:
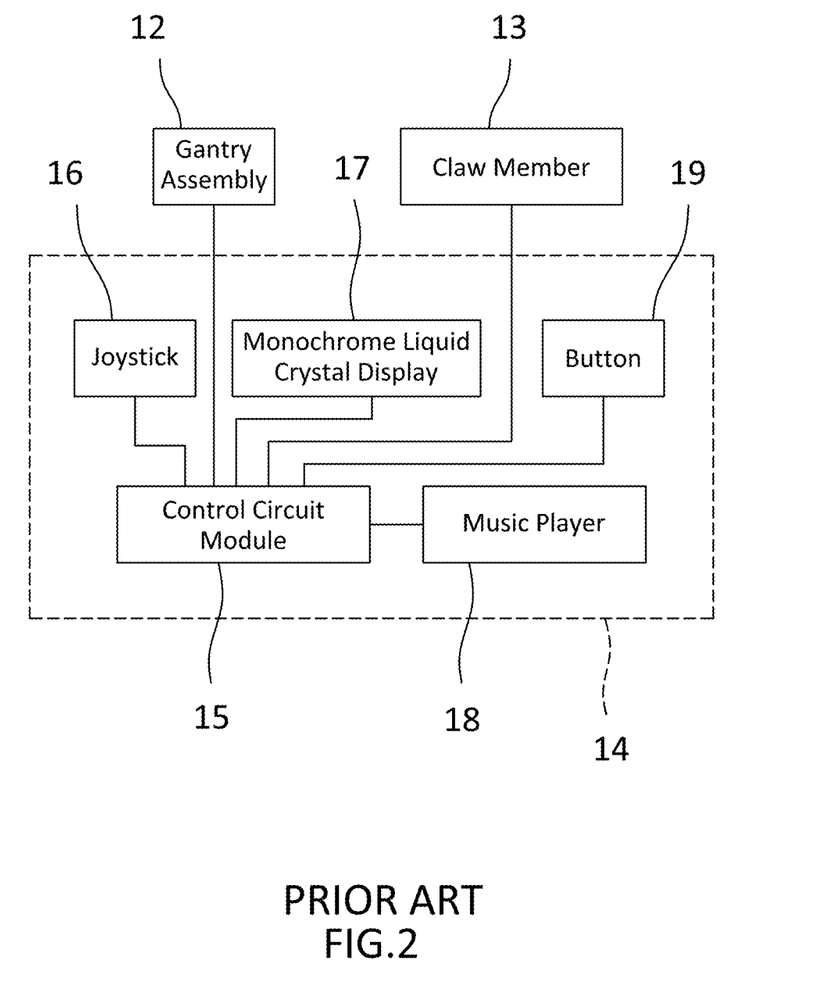
FIG. 2 is a structural diagram of a conventional claw machine.

A conventional claw machine, as shown in FIGS. 1 and 2, comprises a cabinet 10 having a clear window 101. The cabinet 10 holds therein a plurality of prizes 11. The cabinet 10 has its inner top provided with a gantry assembly 12 that can move leftward, rightward, forward and backward. A claw member 13 attached to the gantry assembly 12 from below is configured to move vertically as well as to open and close. A control device 14 is installed outside the cabinet 10 and is electrically connected to the gantry assembly 12 and the claw member 13. The control device 14 has a control circuit module 15, a joystick 16, a monochrome liquid crystal display 17, a music player 18, and a button 19. The control circuit module 15 is electrically connected to the gantry assembly 12, the claw member 13, the joystick 16, the monochrome liquid crystal display 17, the music player 18, and the button 19. A player after putting one or more coins can operate the joystick 16 of the control device 14 to displace the gantry assembly 12 and the claw member 13 in order to claw a prize 11 held in the cabinet 10. The prize 11 clawed by the claw member 13 is eventually delivered through a collection hole 102 that is installed on the cabinet 10 and communicated with the exterior and becomes accessible to the player. In order to keep consumers' feeling of fervor and pleasure to the game, owners of claw machines have to change machines' settings to make the game continuously interesting. Taking the change in grabbing strength of the claw member 13 for example, the setting is made through the monochrome liquid crystal display 17. Specifically, different codes shown in the monochrome liquid crystal display 17 represent different strength levels. As a further example, the music played by the music player 18 is also set through the monochrome liquid crystal display 17. Specifically, different codes shown in the monochrome liquid crystal display 17 represent different music tracks. However, the foregoing claw machine has the following defects:

1. As the monochrome liquid crystal display 17 only provides limited information, in order to alter the values of setting items set by the factory, machine owners have to memorize respective codes used in different setting items; otherwise, they have to consult machine manuals and even ask help from machine manufacturers, making setting inconvenient; and 2. Since the existing claw machine only provide games that are fixedly programmed, they can soon become monotonous and uninteresting to consumers, and this is adverse to prospects of claw machines.

SUMMARY OF THE PRESENT INVENTION

The primary objective of the present invention is to solve the foregoing problems by providing a setting device for a claw machine, which comprises a color liquid crystal display control device. The color liquid crystal display is configured to display a setting interface. The setting interface includes: a common setting field, a claw strength setting field, a gantry assembly setting field, a music setting field, a system setting field, a business report field, and an exit field, which enable machine owners to set values for setting items of the claw machine easily and readily through the setting interface.

DETAILED DESCRIPTION OF THE PREFERRED EMBODIMENT

The invention as well as a preferred mode of use, further objectives and advantages thereof will be best understood by reference to the following detailed description of illustrative embodiments when read in conjunction with the accompanying drawings.

Figure 3:
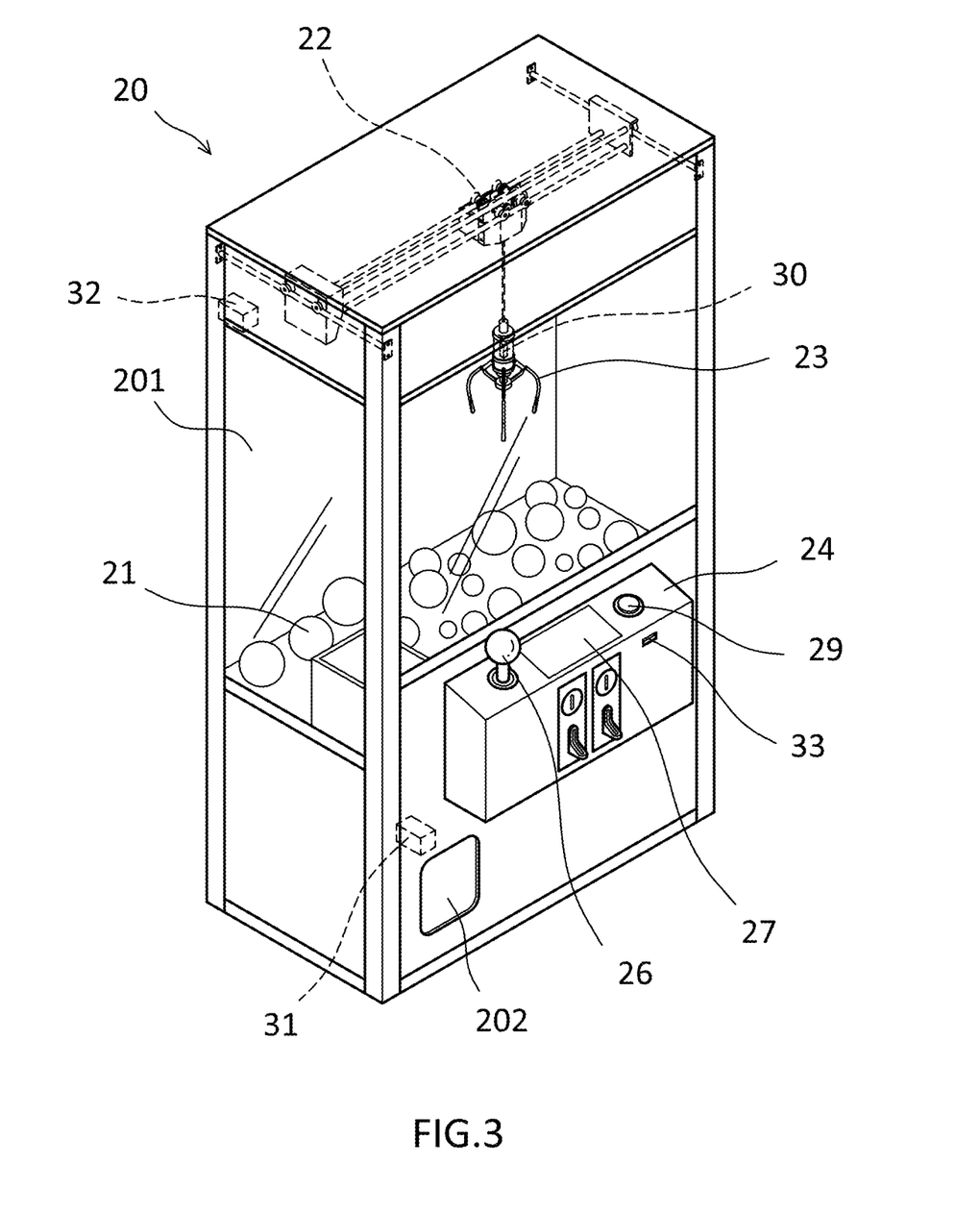
FIG. 3 is a perspective view of a claw machine according to the present invention.
Figure 4:
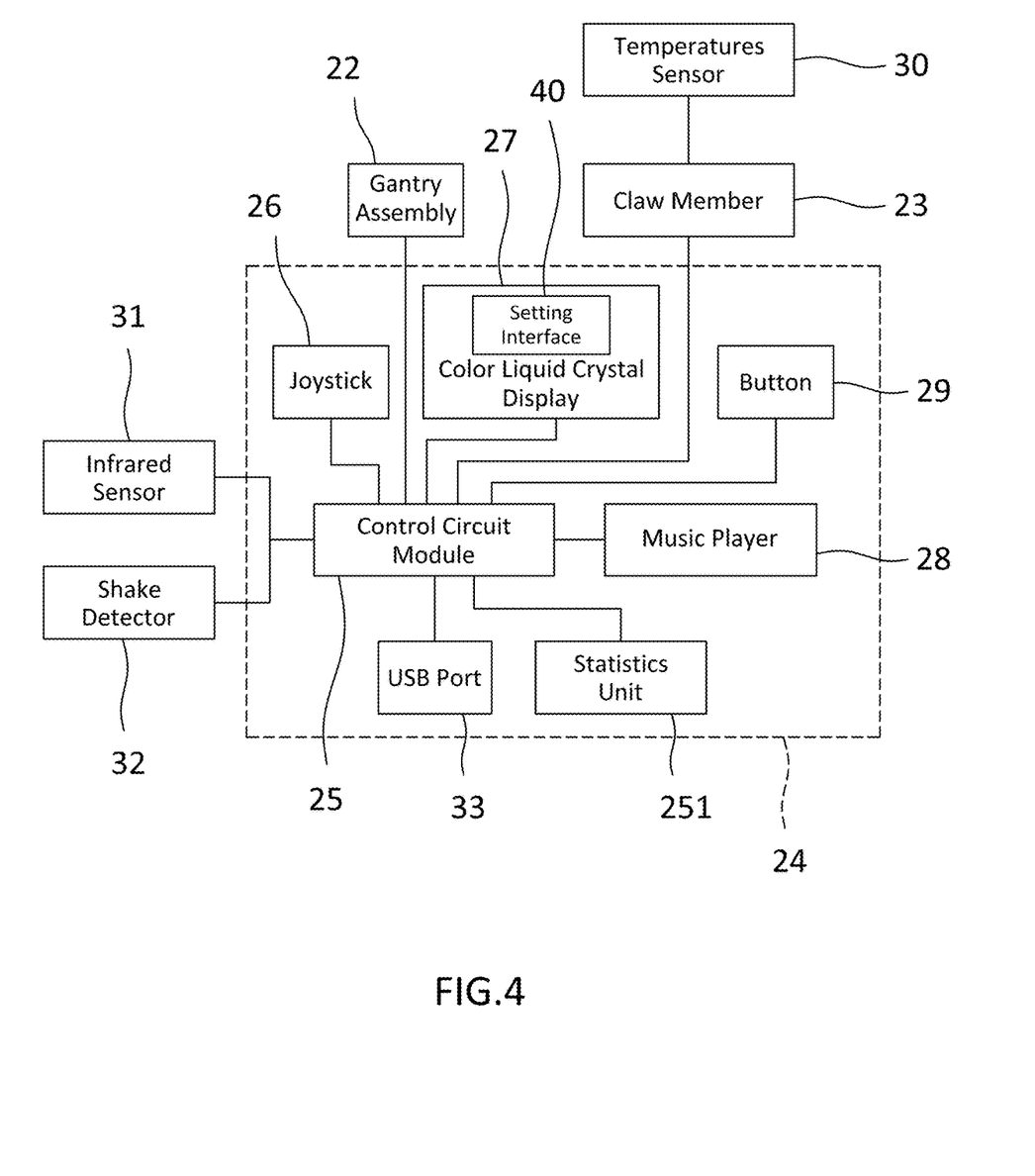
FIG. 4 is a structural diagram of a claw machine according to the present invention.
Figure 5:
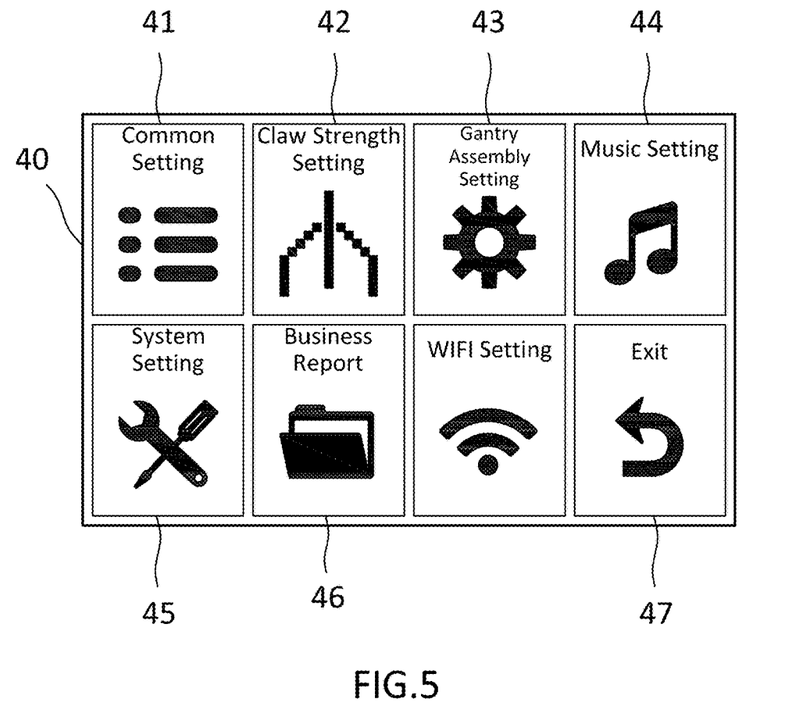
FIG. 5 shows a setting interface of a claw machine according to the present invention.
Figure 6:
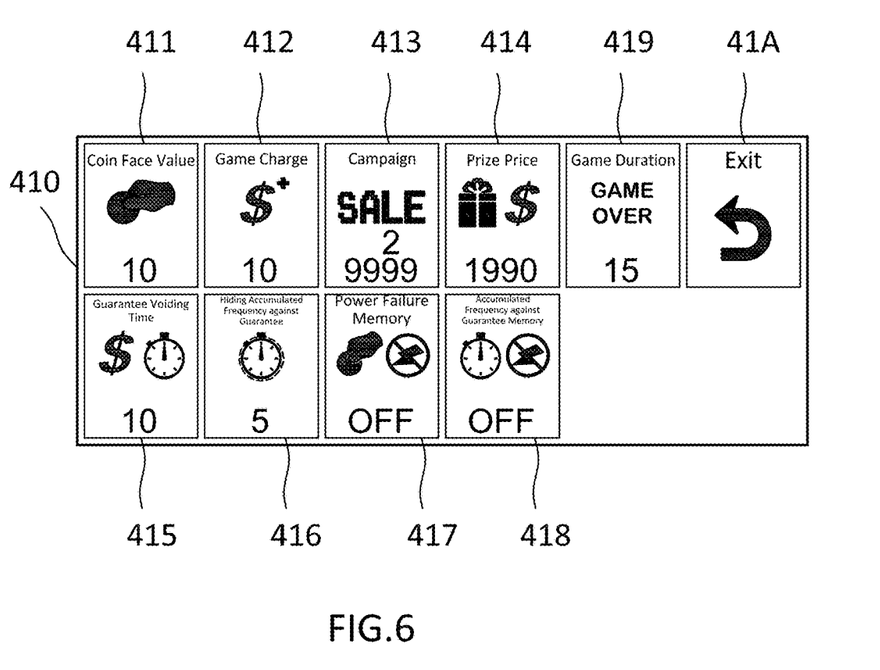
FIG. 6 shows a common setting interface of a claw machine according to the present invention.
Figure 7:
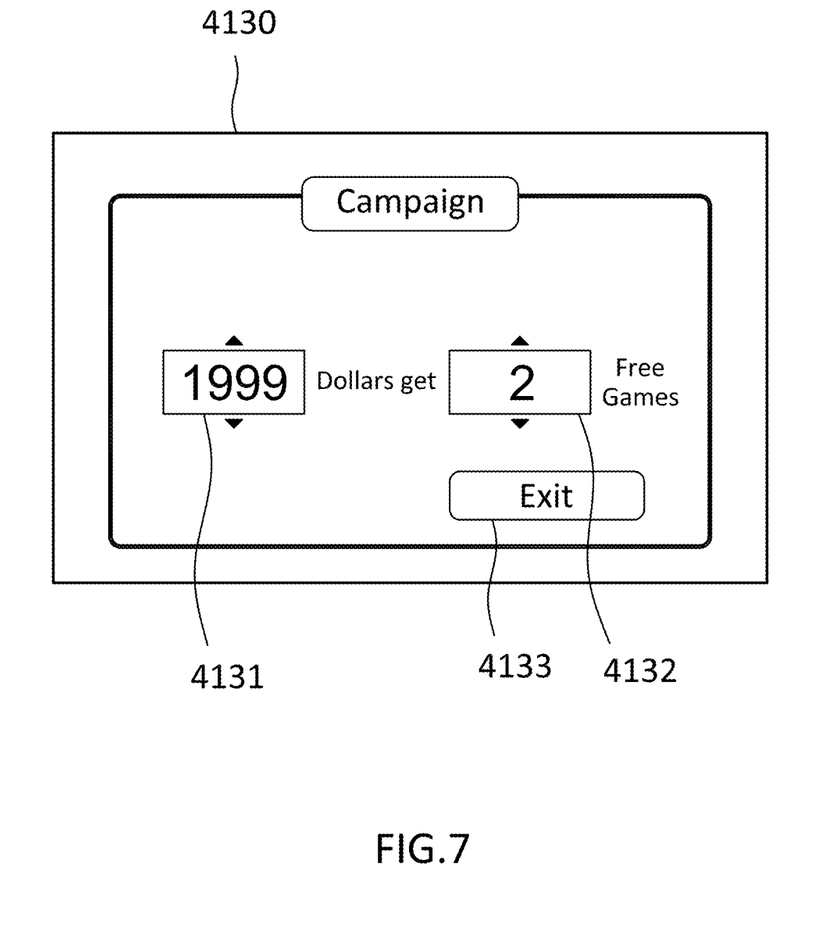
FIG. 7 shows a campaign setting field of a claw machine according to the present invention.
Figure 8:
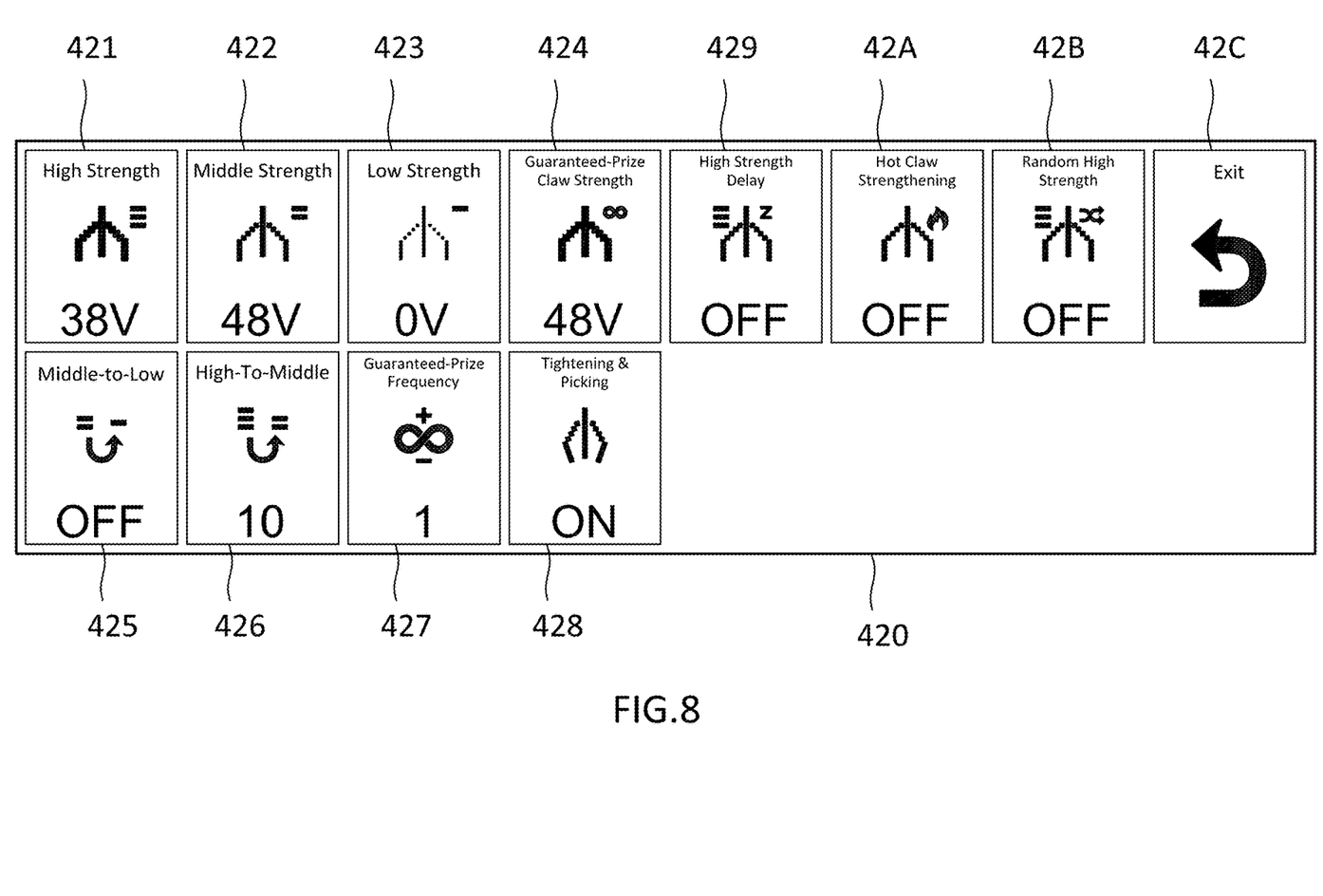
FIG. 8 shows a claw strength setting interface of a claw machine according to the present invention.
Figure 9:
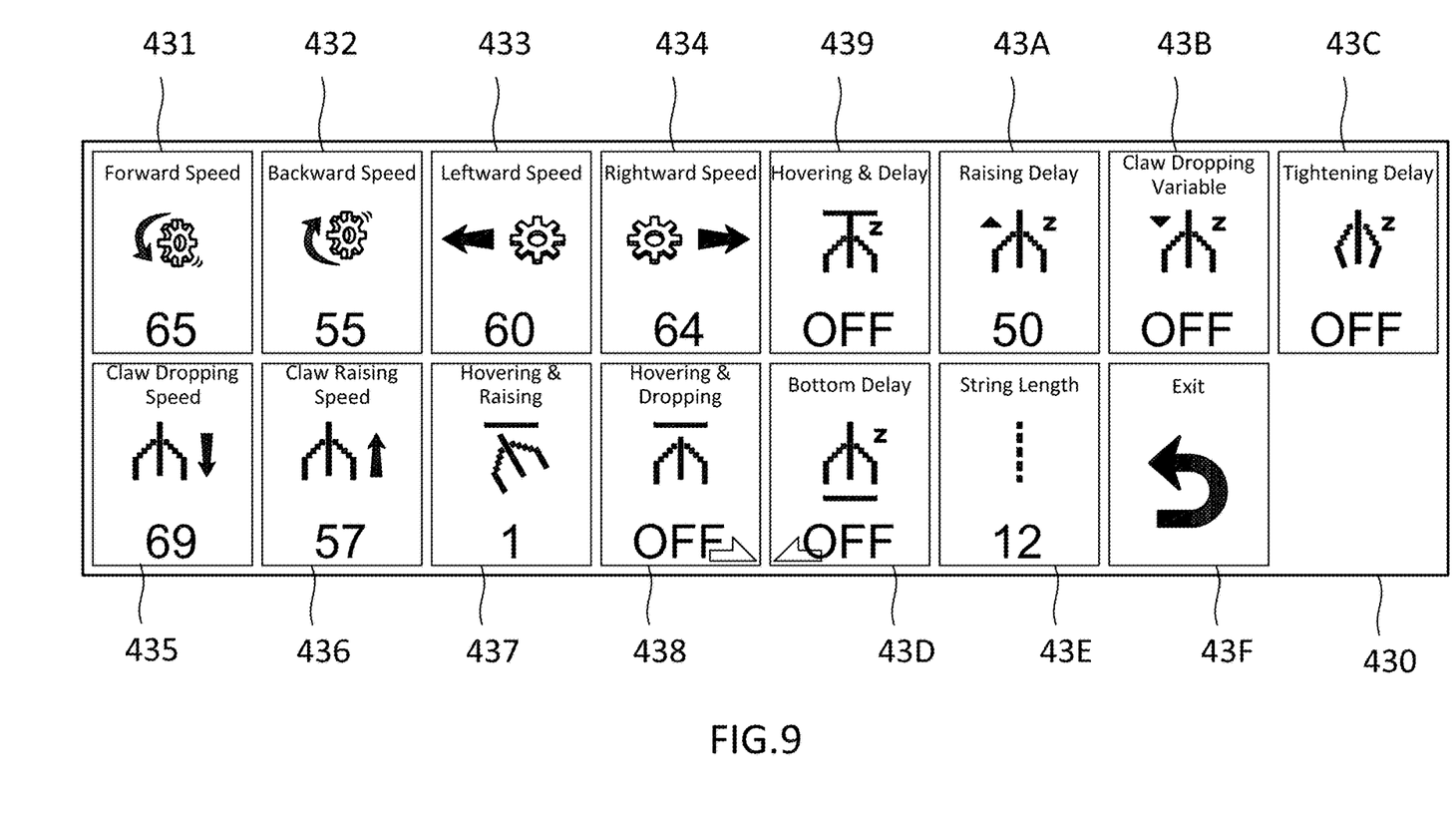
FIG. 9 shows a gantry assembly setting interface of a claw machine according to the present invention.
Figure 10:
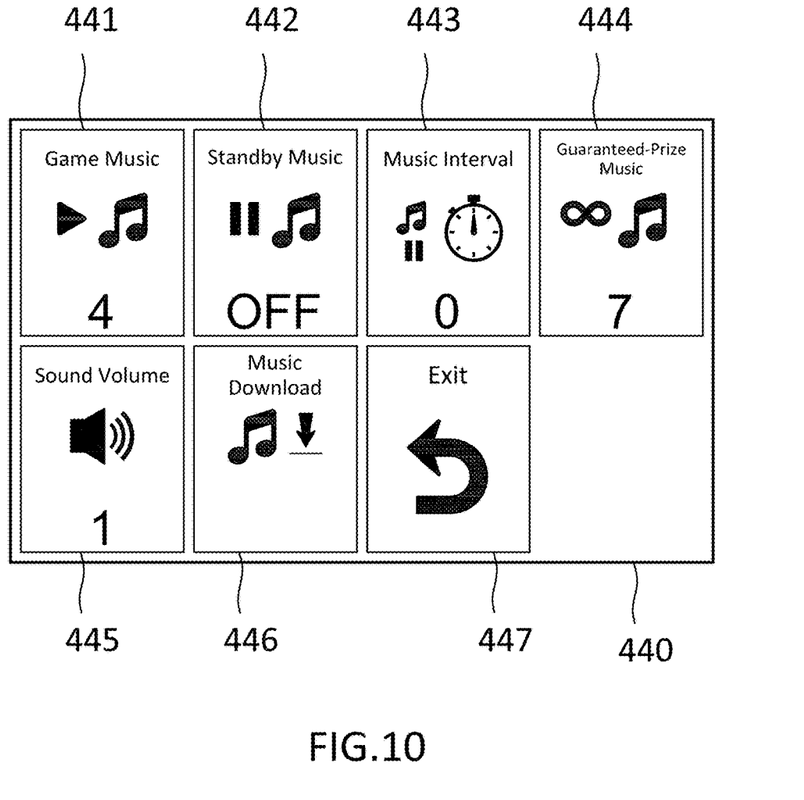
FIG. 10 shows a music setting interface of a claw machine according to the present invention.
Figure 11:
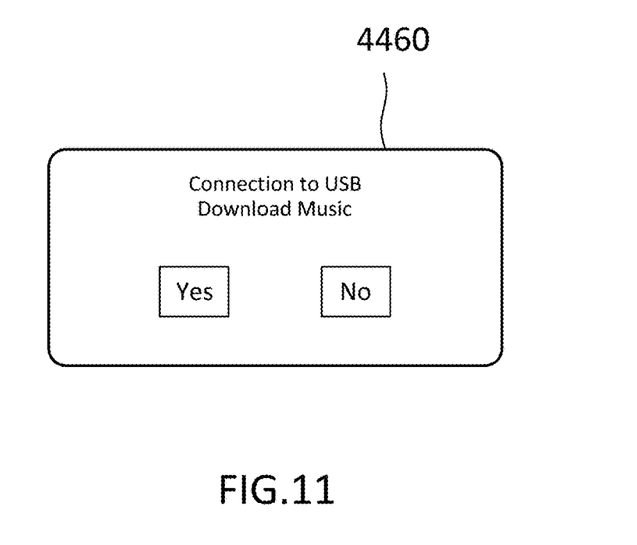
FIG. 11 shows a music download confirmation interface of a claw machine according to the present invention.
Figure 12:
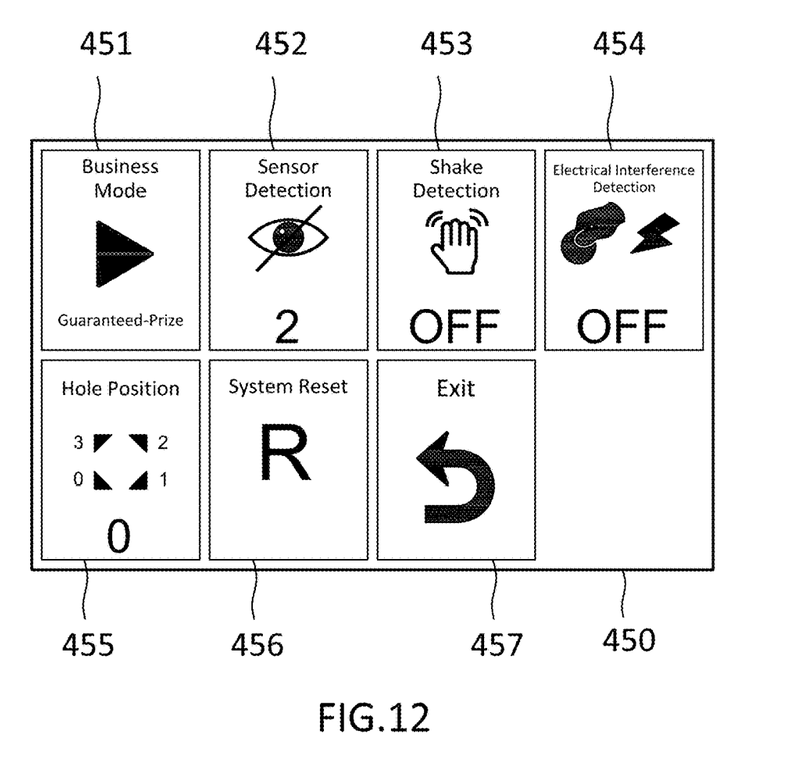
FIG. 12 shows a system setting interface of a claw machine according to the present invention.
Figure 13:
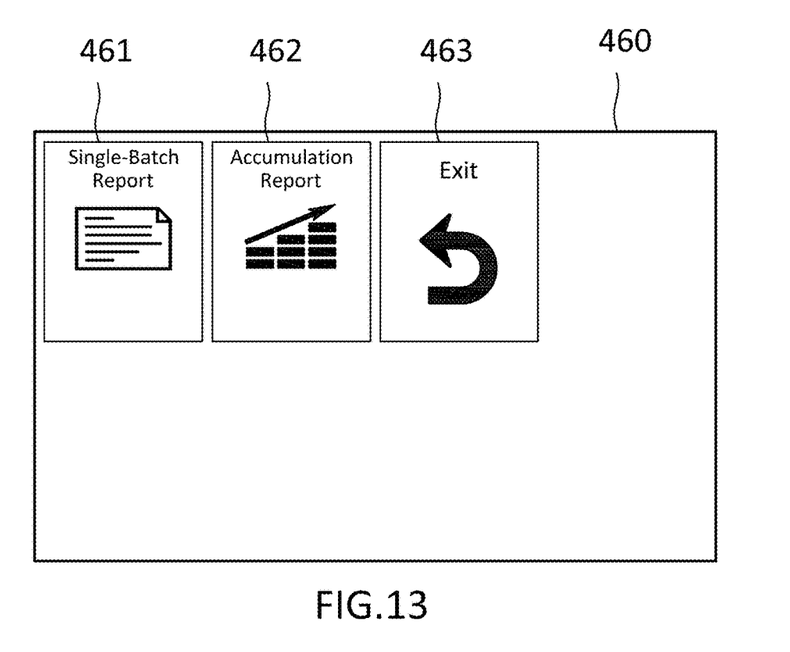
FIG. 13 shows a business report setting interface of a claw machine according to the present invention.
Figure 14:
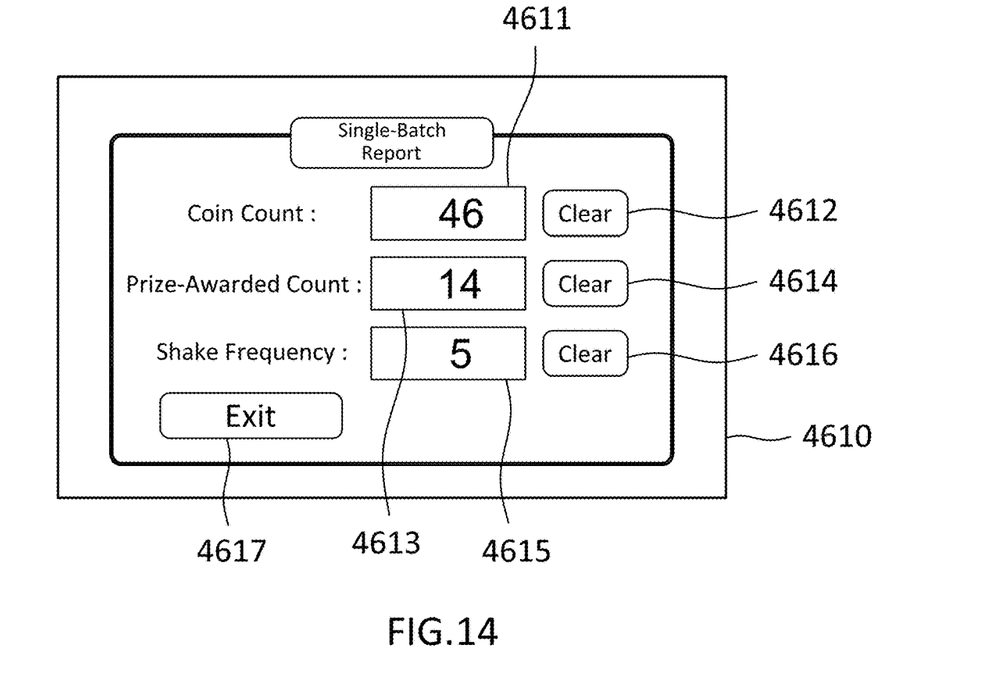
FIG. 14 shows a single-batch report interface of a claw machine according to the present invention.
Figure 15:
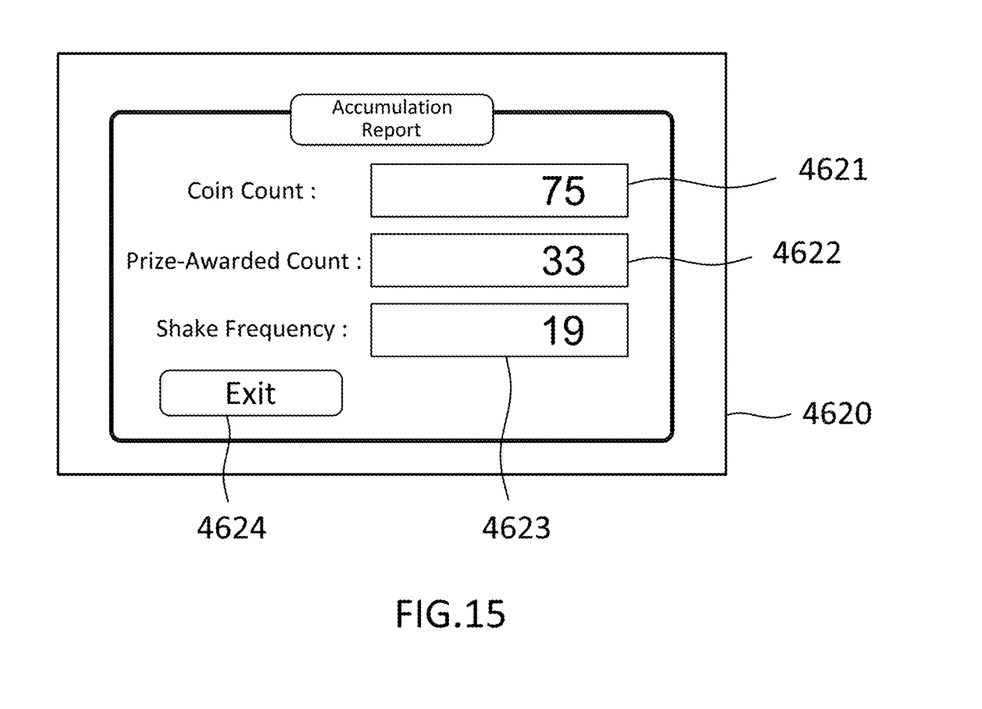
FIG. 15 shows an accumulative report interface of a claw machine according to the present invention.

Referring to FIGS. 3 through 15, the present invention provides a setting device for a claw machine, which includes a cabinet 20 having a clear window 201 (as shown in FIG. 3). The cabinet 20 holds therein a plurality of prizes 21. The cabinet 20 has its top provided with a gantry assembly 22 that can move leftward, rightward, forward and backward. A claw member 23 attached to the gantry assembly 22 from below through a string is configured to move vertically as well as to open and close. A control device 24 is installed outside the cabinet 20 and is electrically connected to the gantry assembly 22 and the claw member 23, as shown in FIG. 4. The control device 24 has a control circuit module 25, a joystick 26, a color liquid crystal display 27, a music player 28, and a button 29. The control circuit module 25 includes a statistics unit 251 for accumulating, computing and memorizing values. The claw member 23 is equipped with a temperature sensor 30. After putting one or more coins, a player is allowed to operate the joystick 26 of the control device 24 to displace the gantry assembly 22 and the claw member 23 in order to claw one of the prizes 21 held in the cabinet 20. The prize 21 clawed is eventually delivered through a collection hole 202 that is installed on the cabinet 20 and communicated with the exterior and becomes accessible to the player. The collection hole 202 is equipped with an infrared sensor 31. The cabinet 20 has therein a shake detector 32, and the control device 24 has a USB port 33 exposed to the exterior. The control circuit module 25 is electrically connected to the gantry assembly 22, the claw member 23, the joystick 26, the color liquid crystal display 27, the music player 28, the button 29, the temperature sensor 30, the infrared sensor 31, the shake detector 32, and the USB port 33. The color liquid crystal display 27 is configured to show the accumulated number of coins put in counted by the statistics unit 251 in a preset time period (such as a case where only coins put in continuously within a period of 90 seconds are counted into the accumulated number, and after the period the accumulated number is zeroed), and is also configured to alternatively show a setting interface 40 (as shown in FIG. 5). The setting interface 40 includes a common setting field 41, a claw strength setting field 42, a gantry assembly setting field 43, a music setting field 44, a system setting field 45, a business report field 46, and an exit field 47. By operating the joystick 26 and pressing the button 29, the player can operate the setting interface 40. Therein, the joystick 26 is used to highlight the field of interest, and the button 29 is used to choose the highlighted field for execution. The common setting field 41 provide access to a common setting interface 410 (as shown in FIG. 6), which includes a coin face value field 411, a game charge field 412, a campaign field 413, a prize price field 414, a guarantee voiding time field 415, a hiding accumulated frequency against guarantee field 416, a power failure memory field 417, an accumulated frequency against guarantee memory field 418, a game duration field 419, and an exit field 41A. The coin face value field 411 is used to set the monetary value of every coin put in. The game charge field 412 is used to set the monetary value of coins required by each game. The campaign field 413 is used to open a campaign setting field 4130 (as shown in FIG. 7), which includes a total value setting area 4131, a frequency setting area 4132, and a return setting area 4133. The total value setting area 4131 is used to set the accumulated monetary value of coins put in. The frequency setting area 4132 is used to set the number of complimentary games awarded when the accumulated monetary value set in the total value setting area 4131 is reached, where in a complimentary game referred to an attempt to operate the control device 24 to get a prize 21 without putting in any coins. The return setting area 4133 is used to return to the common setting interface 410. The prize price field 414 is used to set the monetary value of each of the prizes 21. Accordingly, when the statistics unit 251 finds that the accumulated monetary value of coins put in reaches the monetary value set in the prize price field 414, the disclosed device awards the player with the set number of complimentary games where the player can operate the control device 24 to get a prize 21 without putting in any coins (i.e. a guarantee of prize winning). The guarantee voiding time field 415 is used to set a time limit beyond which the player is no more allowed to operate the control device 24 to get a prize 21 without putting in any coins and when set as "OFF" the corresponding function is deactivated. The hiding accumulated frequency against guarantee field 416 is used to set a time period in which the color liquid crystal display 27 is prevented from showing the accumulated monetary value of coins put in provided by the statistics unit 251, and when set as "OFF" the corresponding function is deactivated. The power failure memory field 417 is used to switch between "ON" where the remaining number of games remains valid when the power is back on after power outage or power blackout and "OFF" where no preservation is provided. The accumulated frequency against guarantee memory field 418 is used to switch between "ON" where the statistics unit 251 resumes accumulating the monetary value of coins put in when the power is back on after power outage or power blackout and "OFF" where no resumption is provided. The game duration field 419 is used to set the time limit beyond which the control device 24 is not allowed to operate. The exit field 41A is used to return to the setting interface 40. After the claw member 23 moves with the gantry assembly 22 to become over the desired prize 21, the claw member 23 can be dropped to the bottom of the cabinet 20 to grab the prize 21. The claw member 23 when located at the bottom of the cabinet 20 for grabbing the prize 21 operates with its first claw strength level, or is in its "high strength" state. The claw member 23 when raising back with the prize 21 to the middle part in the cabinet 20 operates with its second claw strength level, or is in its "middle strength" state. The claw member 23 when returning back to the top in the cabinet 20 operates with its third claw strength level, or is in its "low strength" state. Then the claw member 23 moves with the gantry assembly 22 to the collection hole 202 and releases the prize 21, which subsequently falls into the collection hole 202. The claw strength setting field 42 is used to open a claw strength setting interface 420 (as shown in FIG. 8), which includes a high strength field 421, a middle strength field 422, a low strength field 423, a guaranteed-prize claw strength field 424, a middle-to-low field 425, a high-to-middle field 426, a guaranteed-prize frequencies field 427, a tightening and picking field 428, a high strength delay field 429, a hot claw strengthening field 42A, a random high strength field 42B, and an exit field 42C. The high strength field 421 is used to set the power voltage that generates the first claw strength level. The middle strength field 422 is used to set the power voltage that generates the second claw strength level. The low strength field 423 is used to set the power voltage that generates the third claw strength level. The guaranteed-prize claw strength field 424 is used to set the first, second and third claw strength levels to the maximum power voltage. The middle-to-low field 425 is used to set the time period of the travel from the second claw strength level to the third claw strength level. The high-to-middle field 426 is used to set the time period of the travel from the first claw strength level to the second claw strength level. The guaranteed-prize frequencies field 427 is used to set the number of complimentary games where the player can operate the control device 24 to get a prize 21 without putting in any coins, wherein the number of complimentary games is infinite or at least one. The tightening and picking field 428 is used to switch between "ON" where the time period in which the first claw strength level is active is prolonged by a preset time period and "OFF" where the corresponding function is deactivated. The high strength delay field 429 is used to set the time period for which implementation of the first claw strength level is delayed, and when set as "OFF" the corresponding function is deactivated. The hot claw strengthening field 42A is used to switch between "ON" where when the temperature sensor 30 of the claw member 23 detects a preset temperature, the power voltages for the first, second and third claw strength levels are compulsorily increased and "OFF" where the corresponding function is deactivated. The random high strength field 42B is used to set an accumulated number of operations beyond which the first, second and third claw strength levels are realized as the high strength level, so that when the accumulated number of operations performed by the control device 24 as detected by the statistics unit 251 reaches the set number, the first, second and third claw strength levels are randomly realized as the high strength level, and when set as "OFF" the corresponding function is deactivated. The exit field 42C is used to return to the setting interface 40. The gantry assembly setting field 43 is used to open a gantry assembly setting interface 430 (as shown in FIG. 9), which includes a forward speed field 431, a backward speed field 432, a leftward speed field 433, a rightward speed field 434, a claw dropping speed field 435, a claw raising speed field 436, a hovering and raising field 437, a hovering and dropping field 438, a hovering and delay field 439, a raising delay field 43A, a claw dropping variable field 43B, a tightening delay field 43C, a bottom delay field 43D, a string length field 43E, and an exit field 43F. The forward speed field 431 is used to set the forward speed of the gantry assembly 22. The backward speed field 432 is used to set the backward speed of the gantry assembly 22. The leftward speed field 433 is used to set the leftward speed of the gantry assembly 22. The rightward speed field 434 is used to set the right speed of the gantry assembly 22. The claw dropping speed field 435 is used to set the dropping speed of the claw member 23. The claw raising speed field 436 is used to set the raising speed of the claw member 23. The hovering and raising field 437 is used to set the length of the string further rolled up after the claw member 23 raises to and stops at the top of the cabinet 20, and when set as "OFF" the corresponding function is deactivated. The hovering and dropping field 438 is used to set the length of the string further released after the claw member 23 raises to and stops at the top of the cabinet 20, and when set as "OFF" the corresponding function is deactivated. The hovering and delay field 439 is used to set the time period for which the claw member 23 raising up to the top of the cabinet 20 is held still before further moving, and when set as "OFF" the corresponding function is deactivated. The raising delay field 43A is used to set a time period for which the claw member 23 carrying the prize 21 and stopping at the bottom of the cabinet 20 is held still before being raising back, and when set as "OFF" the corresponding function is deactivated. The claw dropping variable field 43B is used to set an accumulated number of operations beyond which the claw member 23 is activated to drop, so that when the accumulated number of operations where the claw member 23 drops detected by the statistics unit 251 reaches the set number, claw member 23 is activated to drop at different dropping speeds, and when set as "OFF" the corresponding function is deactivated. The tightening delay field 43C is used to set the time period for which the claw member 23 when being at the bottom of the cabinet 20 bottom operates at the high strength level to grab the prize 21, and when set as "OFF" the corresponding function is deactivated. The bottom delay field 43D is used to set the time period for which the claw member 23 dropping to the bottom of the cabinet 20 is held still before grabbing the prize 21, and when set as "OFF" the corresponding function is deactivated. The string length field 43E is used to set the length of the string released for dropping the claw member 23. The exit field 43F is used to return to the setting interface 40. The music setting field 44 is used to open a music setting interface 440 (as shown in FIG. 10), which includes a game music field 441, a standby music field 442, a music interval field 443, a guaranteed-prize music field 444, a sound volume field 445, a music download field 446 and an exit field 447. The game music field 441 is used to set the music track to be played by the music player 28 during games. The standby music field 442 is used to set the music track to be played by the music player 28 during standby between games. The music interval field 443 is used to set the time interval between two music tracks played by the music player 28. The guaranteed-prize music field 444 is used to set the music track played by the music player 28 during complimentary games where players can operate the control device 24 to get a prize 21 without putting in any coins. The sound volume field 445 is used to set the sound volume of the music track played by the music player 28 during games. The music download field 446 is used to open a music download confirmation interface 4460 (as shown in FIG. 11), where "Yes" or "No" can be chosen to determine whether music tracks stored in a portable storage device (such as a USB stick) inserted into the USB port 33 are to be downloaded. The exit field 447 is used to return to the setting interface 40. The system setting field 45 is used to open a system setting interface 450 (as shown in FIG. 12), which includes a business mode field 451, a sensor detection field 452, a shake detection field 453, an electrical interference detection field 454, a hole position field 455, a system reset field 456, and an exit field 457. The business mode field 451 is where the claw machine is set into any of a normal mode, a guaranteed-prize mode and a complimentary game mode. In the normal mode, the claw machine operates with default settings. In the guaranteed-prize mode, the control device 24 can be operated until a prize 21 is awarded. In the complimentary game mode, the control device 24 can be operated for an unlimited number of games to grab prizes 21 and no coins have to be put in. The sensor detection field 452 is used to set the time period for which the infrared sensor 31 is turned off after detecting a prize 21 passes through the collection hole 202. The shake detection field 453 is used to switch between "ON" where the claw machine stops when the shake detector 320 detects the cabinet 20 is shaken and "OFF" where the corresponding function is deactivated. The electrical interference detection field 454 is used to switch between "ON" where the claw machine stops when the control circuit module 25 receives an improper external voltage and "OFF" where the corresponding function is deactivated. The hole position field 455 is used to set where the claw member 23 is released, i.e. any of the four inner corners of the cabinet 20. The system reset field 456 is used to reset all the setting items to their default values. The exit field 457 is used to return to the setting interface 40. The business report field 46 is used to open a business report setting interface 460 (as shown in FIG. 13), which includes a single-batch report field 461, an accumulative report field 462 and an exit field 463. The single-batch report field 461 is used to open a single-batch report interface 4610 (as shown in FIG. 14), which includes a coin count information area 4611, a clear button 4612 for the coin count information area 4611, a prize-awarded frequency information area 4613, a clear button 4614 for the prize-awarded frequency information area 4613, a shake frequency information area 4615, a clear button 4616 for the shake frequency information area 4615, and a return setting button 4617. The coin count information area 4611 shows the total number of coins put into the claw machine from the last time when the information was cleared to the present time when the single-batch report interface 4610 is opened, and use of the clear button 4612 can zero the coin count information area 4611, thereby clearing the information again. The prize-awarded count information area 4613 shows the total number of the prizes 21 won by players from the last time when the information was cleared to the present time when the single-batch report interface 4610 is opened, and use of the clear button 4614 can zero the prize-awarded count information area 4613, thereby clearing the information again. The shake frequency information area 4615 shows the total number of times the claw machine has been undue shaken from the last time when the information was cleared to the present time when the single-batch report interface 4610 is opened, wherein the total number may be provided by the statistics unit 251, and use of the clear button 4616 can zero the prize-awarded count information area 4613, thereby clearing the information again. The return setting button 4617 is used to return to the business report setting interface 460. The accumulative report field 462 is used to open an accumulative report interface 4620 (as shown in FIG. 15), which includes a total coin count information area 4621, a total prize-awarded information area 4622, a total shake information area 4623 and an exit button 4624. The total coin count information area 4621 shows the total number of times coins have been put during all the business hours, and this total number cannot be cleared. The total prize-awarded count information area 4622 shows the total number of prizes 21 have been awarded during all the business hours, and this total number cannot be cleared. The total shake information area 4623 shows the total number of times the claw machine has been undue shaken, wherein the total number may be provided by the statistics unit 251, and this total number cannot be cleared. The exit button 4617 is used to return to the business report setting interface 460, and the exit field 463 is used to return to the setting interface 40. With the disclosed device, a machine owner can set values for various setting items of the claw machine easily and readily through the setting interface 40, thereby providing players with variable playing experiences and in turn increasing revenues of the claw machine.

The composition and operation of the present invention will be detailed as below. Referring to FIGS. 3 through 15, a machine owner can use the joystick 26 and the button 29 to alter values of various setting items through the setting interface 40 rapidly. As shown in FIG. 5, the home page of the setting interface 40 includes the common setting field 41, the claw strength setting field 42, the gantry assembly setting field 43, the music setting field 44, the system setting field 45, the business report field 46, and the exit field 47. Each of the fields may have a unique background color for easy recognition. To select a field, a machine owner may first sway the joystick 26 to the right or the left to highlight that field, and then press the button 29 to make that filed selected. Afterwards, the user may sway the joystick 26 upward or downward to highlight a desired option, alternative or value, and press the button 29 again to confirm change in the field. The setting interface 40 is now further detailed as below. Referring to FIG. 6, in the common setting interface 410 of the common setting 41, the coin face value field 411 is set to reflect the monetary value of every coin put into the claw machine so as to make the control device and in turn the claw machine adaptable to different countries, and the game charge field 412 is set with a value that is a multiple of the value set in the coin face value field 411. The campaign field 413 provides players with complimentary games where they can attempt to grab the prizes 21 without putting in any coins, so as to add surprising pleasure. The guarantee voiding time field 415 is to set the time limit for a round of guarantee, so as to prevent players from wasting the complimentary games and indirectly reducing the revenues of the claw machine. The hiding accumulated frequency against guarantee field 416 is set to hide the relevant information after the set time period, so as to prevent a successive player successes the monetary value accumulated by his/her previous player. Referring to FIG. 8, in the claw strength setting interface 420 of the claw strength setting 42, the high strength field 421, the middle strength field 422, the low strength field 423, and the guaranteed-prize claw strength field 424 may each have a power voltage ranging between 0V and 48V. When "ON" is set in the tightening and picking field 428, the first claw strength level acts for a prolonged time period. This makes it easier for a player to win a prize 21, thereby adding pleasure to the player. On the other hand, the setting in the high strength delay field 429 can defer activation of the first claw strength level at the claw member 23. This can make the grabbing behavior different from what a player would expect, thereby making the game more challenging and exciting players' desire for conquest. Furthermore, the claw member 23 may become weak as it continuously operates and gets hot over time. For compensating this, "ON" can be set in the hot claw strengthening field 42A so that the power voltages corresponding to the first, second and third claw strength levels are increased, thereby ensuring that the claw member 23 operates normally even when it gets hot. In the gantry assembly setting interface 430 of the gantry assembly setting 43, the hovering and raising field 437 is used to set the length of the string further rolled up after the claw member 23 raises to and stops at the top of the cabinet 20. This ensures that the claw member 23 can reach and positioned at the upmost position in the cabinet 20 without swing even when the string become slack over time. The hovering and dropping field 438 is used to set the length of the string released for dropping the claw member 23. This ensures that claw member 23 can reach and positioned at the upmost position in the cabinet 20 without excessively tensioning the string when the newly fitted string is relatively tight, thereby protecting the string from premature slack. The setting in the hovering and delay field 439 can make the claw member 23 stay still at the top of the cabinet 20 for a preset time period before starting to move. This can add the chance that the grabbed prize 21 falls off, thereby making the game more challenging. The setting in the raising delay field 43A makes the claw member 23 stay still at the bottom of the cabinet 20 for a preset period of time before starting to raise. This can change how the prize 21 is lifted and can make the grabbing behavior different from what a player would expect, thereby making the game more challenging. The claw dropping variable field 43B is such set that when the accumulated number of operations provided by the statistics unit 251 reaches a preset value, the dropping speed of the claw member 23 changes. This can make the grabbing behavior different from what a player would expect, thereby making the game more challenging. Then the accumulated number of operations recorded in the statistics unit 251 is zeroed, and a new round of accumulation starts. The setting in the tightening delay field 43C allows the claw member 23 to grab the prize 21 with the high strength level for a prolonged time period, so the prize 21 can be grabbed more firmly. This makes it easier for a player to win a prize 21. The setting in the bottom delay field 43D allows the claw member 23 to stay still at the bottom of the cabinet 20 for a preset time period before starting to grab the prize 21. This delay can make the timing point of grabbing different from what a player would expect, thereby making the game more challenging. Referring to FIG. 12, in the system setting interface 450 of the system setting field 45, options for the business mode field 451 include the normal mode, the guaranteed-prize mode and the complimentary game mode. These options can be alternatively selected to facilitate introduction and demonstration of the claw machine. The time setting or deactivation of the sensor detection field 452 helps to reduce power consumption or to protect the infrared sensor 31. Activation of the shake detection field 453 helps to protect the prizes 21 from rigged operations, and enable the shake detector 32 to provide the statistics unit 251 with information on the time and the number of times such shaking happened. Activation of the electrical interference detection field 454 helps to protect the claw machine from interferences caused by players' undue operations and to protect the prizes 21 from rigged operations, such as through externally applying interfering voltage. The location options for the hole position field 455 are such designed that the control device 24 is suitable for cabinets of different profiles, thereby increasing versatility of the disclosed device. With the disclosed device, a machine owner can set values for various setting items of the claw machine easily and readily through the setting interface 40, thereby providing players with variable playing experiences and in turn increasing revenues of the claw machine.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A setting device for a claw machine, comprising:
a cabinet, for holding a plurality of prizes therein, having a collection hole communicated with an exterior thereof and comprising a movable gantry assembly at a top thereof, a claw member being attached to the gantry assembly from below through a string and configured to move vertically as well as to open and close;
a control device installed outside the cabinet and electrically connected to the gantry assembly and the claw member, wherein the control device comprises a control circuit module, a joystick, a color liquid crystal display, and a button, wherein the control circuit module includes a statistics unit for accumulating, computing and memorizing values, thereby after putting one or more coins, a player being allowed to operate the joystick of the control device to displace the gantry assembly and the claw member, wherein the control circuit module being electrically connected to the gantry assembly, the claw member, the joystick, the color liquid crystal display, and the button, wherein the color liquid crystal display is configured for showing an accumulated number of coins put in the claw machine counted by the statistics unit in a preset time period, and is also configured to alternatively show a setting interface, wherein the setting interface includes a common setting field, a claw strength setting field, a gantry assembly setting field, a music setting field, a system setting field, a business report field, and an exit field, thereby the player is able to operate the setting interface by operating the joystick and pressing the button, wherein the joystick is used to highlight one said field of interest, and the button is used to choose the highlighted field for execution.

2. The setting device, as claimed in claim 1, wherein the common setting field is used to open a common setting interface, which includes a coin face value field, a game charge field, a campaign field, a prize price field, a guarantee voiding time field, a hiding accumulated frequency against guarantee field, a power failure memory field, an accumulated frequency against guarantee memory field, a game duration field, and an exit field, wherein the coin face value field is used to set a monetary value of every coin put in the claw machine for playing one or more games; the game charge field being used to set a monetary value of coins required by each of the one or more game, wherein the campaign field is used to open a campaign setting field, which includes a total value setting area, a frequency setting area, and a exit area, wherein the total value setting area is used to set an accumulated monetary value of coins put in the claw machine for playing said games; the frequency setting area being used to set a number of complimentary games awarded when the accumulated monetary value set in the total value setting area is reached, where in a complimentary game referred to an attempt to operate the control device to get a prize without putting in any coins, wherein the exit area is used to return to the common setting interface, wherein the prize price field is used to set a monetary value of each said prize, wherein, accordingly, when the statistics unit finds that the accumulated monetary value of coins put in reaches the monetary value set in the prize price field, the claw machine awards the player with the set number of said complimentary games, wherein the guarantee voiding time field is used to set a time limit beyond which the player is no more allowed to operate the control device to get one said prize without putting in any coins and when set as "OFF" the corresponding function being deactivated, wherein the hiding accumulated frequency against guarantee field is used to set a time period in which the color liquid crystal display is prevented from showing the accumulated monetary value of coins put in the claw machine provided by the statistics unit, and when set as "OFF" the corresponding function being deactivated, wherein the power failure memory field is used to switch between "ON" where the remaining number of games remains valid when the power is back on after power outage or power blackout and "OFF" where no preservation is provided, wherein the accumulated frequency against guarantee memory field is used to switch between "ON" where the statistics unit resumes accumulating the monetary value of coins put in the claw machine when power is back on after power outage or power blackout and "OFF" where no resumption is provided, wherein the game duration field is used to set a time limit beyond which the control device is not allowed to operate, and the exit field of the common setting interface is used to return to the setting interface.

3. The setting device, as claimed in claim 2, wherein when the claw member is selectively located at a bottom of the cabinet for grabbing the prize operates with a first claw strength level or in a "high strength" state, and when the claw member selectively raises back with the prize to a middle part in the cabinet operates with a second claw strength level or is in a "middle strength" state, while when the claw member returning back to a top in the cabinet selectively operates with a third claw strength level or is in a "low strength" state; the claw member is equipped with a temperature sensor, wherein the control circuit module is electrically connected to the temperature sensor and the claw strength setting field is used to open a claw strength setting interface, which includes a high strength field, a middle strength field, a low strength field, a guaranteed-prize claw strength field, a middle-to-low field, a high-to-middle field, a guaranteed-prize frequencies field, a tightening and picking field, a high strength delay field, a hot claw strengthening field, a random high strength field, and an exit field, wherein the high strength field is used to set a power voltage that generates the first claw strength level, the middle strength field is used to set a power voltage that generates the second claw strength level, and the low strength field is used to set a power voltage that generates the third claw strength level, wherein the guaranteed-prize claw strength field is used to set the first, second and third claw strength levels to the maximum power voltage, wherein the middle-to-low field is used to set a time period of a travel from the second claw strength level to the third claw strength level, wherein the high-to-middle field is used to set a time period of a travel from the first claw strength level to the second claw strength level, wherein the guaranteed-prize frequencies field is used to set a number of said complimentary games, wherein the number of complimentary games is infinite or at least one, wherein the tightening and picking field is used to switch between "ON" where a time period in which the first claw strength level is active is prolonged by a preset time period and "OFF" where the corresponding function is deactivated, wherein the high strength delay field being used to set a time period for which implementation of the first claw strength level is delayed, and when set as "OFF", the corresponding function is deactivated, wherein the hot claw strengthening field is used to switch between "ON" where when the temperature sensor of the claw member detects a preset temperature, the power voltages for the first, second and third claw strength levels are compulsorily increased and "OFF" where the corresponding function is deactivated, wherein the random high strength field is used to set an accumulated number of operations beyond which the first, second and third claw strength levels are realized as the high strength level, so that when the accumulated number of operations performed by the control device as detected by the statistics unit reaches the set number, the first, second and third claw strength levels are randomly realized as the high strength level, and when set as "OFF" the corresponding function is deactivated, the exit field of the claw strength setting interface is used to return to the setting interface.

4. The setting device, as claimed in claim 3, wherein the gantry assembly setting field is used to open a gantry assembly setting interface, which includes a forward speed field, a backward speed field, a leftward speed field, a rightward speed field, a claw dropping speed field, a claw raising speed field, a hovering and raising field, a hovering and dropping to field, a hovering and delay field, a raising delay field, a claw dropping variable field, a tightening delay field, a bottom delay field, a string length field, and an exit field, wherein the forward speed field is used to set a forward speed of the gantry assembly, wherein the backward speed field is used to set a backward speed of the gantry assembly, wherein the leftward speed field is used to set a leftward speed of the gantry assembly, wherein the rightward speed field is used to set a right speed of the gantry assembly, wherein the claw dropping speed field is used to set a dropping speed of the claw member, wherein the claw raising speed field is used to set a raising speed of the claw member, wherein the hovering and raising field is used to set a length of the string further rolled up after the claw member raises to and stops at the top of the cabinet, and when set as "OFF", the corresponding function is deactivated, wherein the hovering and dropping field is used to set a length of the string further released after the claw member raises to and stops at the top of the cabinet, and when set as "OFF", the corresponding function is deactivated, wherein the hovering and delay field is used to set the time period for which the claw member raising up to the top of the cabinet is held still before further moving, and when set as "OFF", the corresponding function is deactivated, wherein the raising delay field is used to set a time period for which the claw member carrying the prize and stopping at the bottom of the cabinet is held still before being raising back, and when set as "OFF", the corresponding function is deactivated, wherein the claw dropping variable field is used to set an accumulated number of operations beyond which the claw member is activated to drop, so that when the accumulated number of operations where the claw member drops detected by the statistics unit reaches the set number, claw member is activated to drop at different dropping speeds, and when set as "OFF", the corresponding function is deactivated, wherein the tightening delay field is used to set a time period for which the claw member when being at the bottom of the cabinet bottom operates at the high strength level to grab the prize, and when set as "OFF" the corresponding function is deactivated, wherein the bottom delay field is used to set a time period for which the claw member dropping to the bottom of the cabinet is held still before grabbing the prize, and when set as "OFF", the corresponding function is deactivated, wherein the exit field is used to return to the setting interface.

5. The setting device, as claimed in claim 4, wherein the control device has a music player and a USB port, wherein the control circuit module is electrically connected to the music player and the USB port, wherein the music setting field is used to open a music setting interface, which includes a game music field, a standby music field, a music interval field, a guaranteed-prize music field, a sound volume field, a music download field, and an exit field, wherein the game music field is used to set a music track to be played by the music player during said games, wherein the standby music field is used to set a music track to be played by the music player during standby between the games, wherein the music interval field is used to set a time interval between two said music tracks played by the music player, wherein the guaranteed-prize music field is used to set a music track played by the music player during said complimentary games, wherein the sound volume field is used to set a sound volume of the music track played by the music player during the games, wherein the music download field is used to open a music download confirmation interface, where "Yes" or "No" are to be chosen to determine whether music tracks stored in a portable storage device inserted into the USB port are to be downloaded, wherein the exit field of the music setting interface is used to return to the setting interface.

6. The setting device, as claimed in claim 5, wherein the collection hole is equipped with an infrared sensor and the cabinet has therein a shake detector, wherein the control circuit module is electrically connected to the infrared sensor and the shake detector, wherein the system setting field is used to open a system setting interface, which includes a business mode field, a sensor detection field, a shake detection field, an electrical interference detection field, a hole position field, a system reset field, and an exit field, wherein the business mode field is where the claw machine is set into any of a normal mode, a guaranteed-prize mode and a complimentary game mode; in the normal mode, the claw machine operating with default settings, wherein in the guaranteed-prize mode, the control device is operatable until one said prize is awarded, wherein in the complimentary game mode, the control device is operatable for an unlimited number of games to grab the prizes and no coins have to be put into the claw machine, wherein the sensor detection field is used to set a time period for which the infrared sensor is turned off after detecting one of the prizes passes through the collection hole, wherein the shake detection field is used to switch between "ON" where the claw machine stops when the shake detector detects the cabinet is shaken and "OFF" where the corresponding function is deactivated, wherein the electrical interference detection field is used to switch between "ON" where the claw machine stops when the control circuit module receives an improper external voltage and "OFF" where the corresponding function is deactivated, wherein the hole position field being used to set where the claw member is released, wherein the system reset field is used to reset all the setting items to their default values, wherein the exit field of the system setting interface is used to return to the setting interface.

7. The setting device, as claimed in claim 6, wherein the business report field is used to open a business report setting interface, which includes a single-batch report field, an accumulative report field, and an exit field, wherein the single-batch report field is used to open a single-batch report interface, which includes a coin count information area, a clear button for the coin count information area, a prize-awarded frequency information area, a clear button for the prize-awarded frequency information area, a shake frequency information area, a clear button for the shake frequency information area, and an exit button, wherein the coin count information area shows a total number of coins put into the claw machine from the last time when the information was cleared to the present time when the single-batch report interface is opened, and use of the clear button zeroing the coin count information area, thereby clearing the information again, wherein the prize-giving count information area shows a total number of the prizes awarded to players from the last time when the information was cleared to the present time when the single-batch report interface is opened, and use of the clear button zeroing the prize-giving count information area, thereby clearing the information again, wherein the shake frequency information area shows a total number of times the claw machine has been undue shaken from the last time when the information was cleared to the present time when the single-batch report interface is opened, wherein the total number is provided by the statistics unit, and use of the clear button zeroing the prize-giving count information area, thereby clearing the information again, wherein the exit button of the single-batch report interface is used to return to the business report setting interface, wherein the accumulative report field is used to open an accumulative report interface, which includes a total coin count information area, a total prize-awarded information area, a total shake information area, and an exit button, wherein the total coin count information area showing a total number of times coins which have been put into the claw machine during all business hours of the claw machine, wherein this total number cannot be cleared, wherein the total prize-giving count information area shows a total number of prizes have been awarded during all the business hours, wherein this total number cannot be cleared, wherein the total shake information area shows a total number of times the claw machine has been undue shaken, wherein the total number is provided by the statistics unit, and this total number cannot be cleared, wherein the exit button of the accumulative report interface is used to return to the business report setting interface, wherein the exit field of the business report setting interface is used to return to the setting interface.

\* \* \* \* \*